Patented Aug. 23, 1938

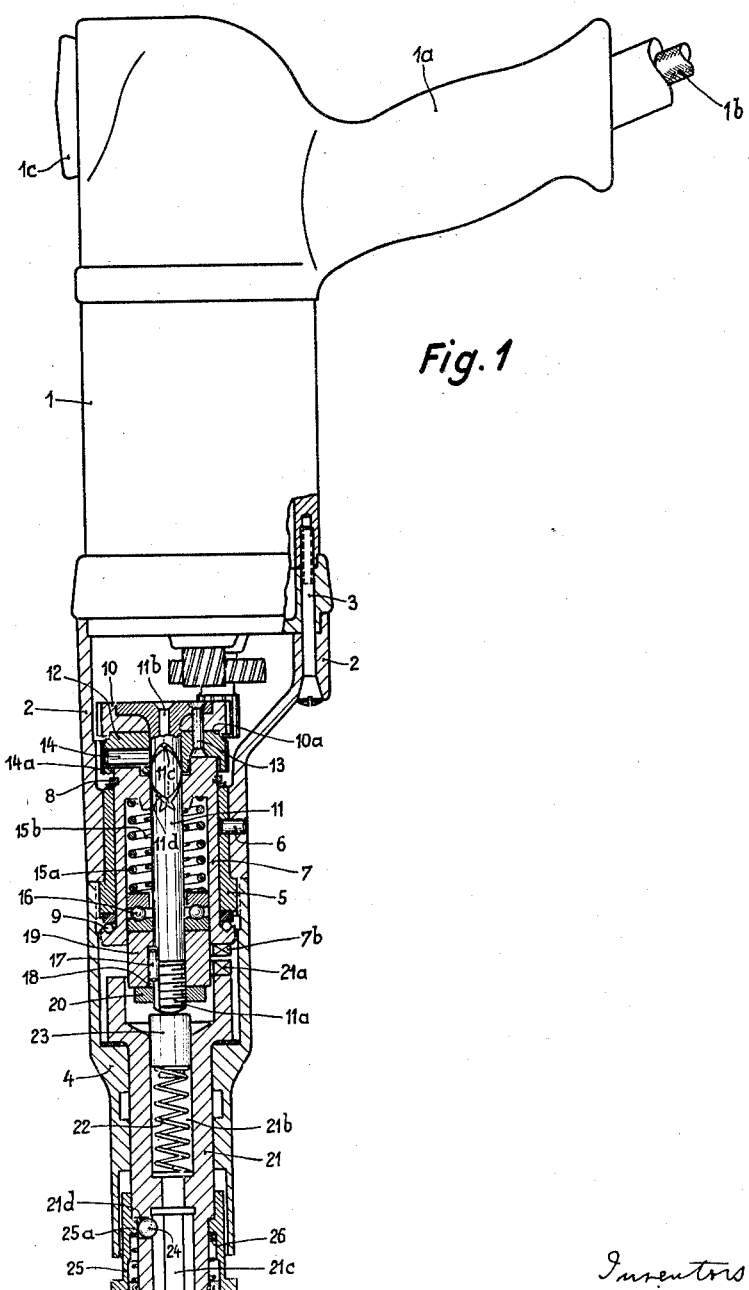

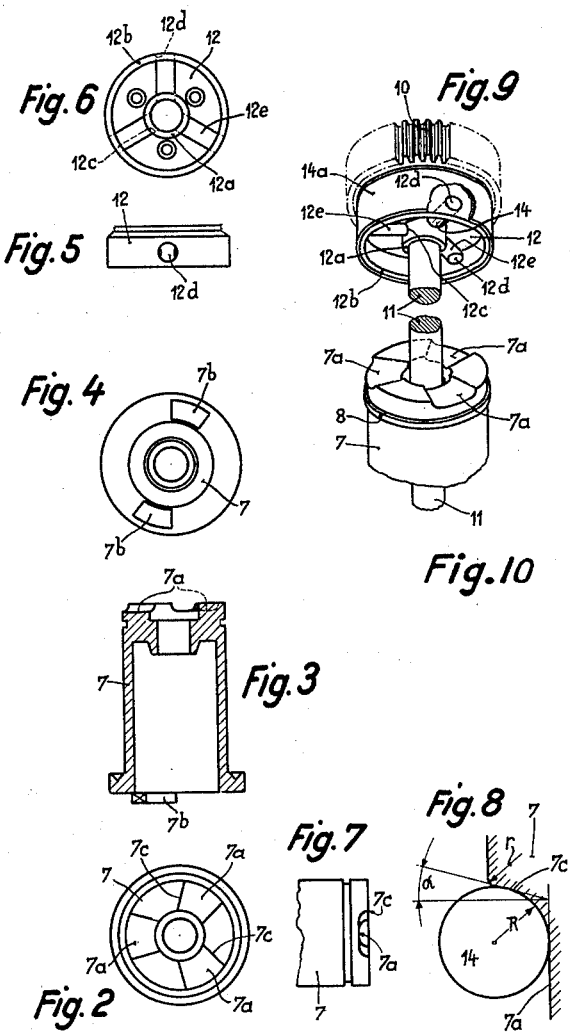

2,127,855

UNITED STATES PATENT OFFICE 2,127,855

POWER-OPERATED TOOL

Ernst Baumgratz, Franz Kratz, and Hermann Steinhart, Stuttgart, Germany, assignors to Robert Bosch Gesellschaft mit beschränkter Haftung, Stuttgart, Germany Application September 28, 1934, Serial No. 746,008
In Germany October 4, 1933

5 Claims. (Cl. 64—29)

The present invention relates to power operated tools.

In tools operated by power, so-called slip clutches are frequently employed, so that the tool is automatically disconnected from the drive when a certain maximum resistance is exceeded. The clutch halves of these clutches have tooth-shaped members interengaging under spring pressure in such a way that the clutch remains in engagement under normal conditions. When however a predetermined resistance is exceeded (for instance, when the head of a screw that is being driven comes to rest on the work) the teeth slide along each other on the inclined tooth flanks, overcoming the pressure of the spring and the mutual friction, diverge from each other, and so come out of engagement. The tool is thereby de-clutched from the drive until the resistance again diminishes.

This period of time from the disengagement of the slip clutch up to the re-engagement, which, when driving in screws, lasts from the seating of the screw head on the work to the withdrawal of the tool from the screw, is often rather long. During the whole of this time the clutch teeth slip over each other, i. e. they strike each other, slide over each other, and strike again, and so on. Even the best material obtainable which can be economically employed hardly suffices to meet these considerable stresses in screw-drivers of large size. Efforts have therefore been made, by providing special means, to reduce the number of slip movements at each revolution. These precautions are however inconvenient and expensive.

The invention starts from the problem of reducing, not the number, but the magnitude and nature of the stresses on the clutch members. In the object of the invention, therefore, clutch members are provided which move past each other, not with sliding, but with rolling friction—roll upon each other—, and at the same time have a contact surface as large as possible. These conditions are best fulfilled by rollers which are revolubly guided in the clutch bodies. These rollers may, as counter clutch parts, be associated either with correspondingly shaped depressions in the opposing halves of the clutch or with spaces between rollers also mounted in the opposing clutch halves.

An example of construction of the invention applied to a screw-driver is diagrammatically shown in the accompanying drawings, in which:—

Figure 1 shows a screw-driver having a pistol-shaped handle, in the front part of which, shown in section, the invention is embodied.

Figure 2 is an end end view looking down upon the driven member of the clutch, which member is shown in longitudinal section in Figure 3.

Figure 4 is a view of the other side of said member.

Figure 5 is a side elevation of the driving clutch member and Figure 6 is an end view of this member showing the clutch rollers.

Figure 7 is a side elevation of a portion of the member shown in Figures 2 and 3.

Figure 8 shows in an enlarged scale a clutch roller engaging or bearing against a clutch tooth.

Figure 9 is a perspective view of the essential parts of the driving portion of the clutch in an assembled condition, and Figure 10 is a partial assembly view, similar to Figure 9, but taken from a different point, and showing primarily the driven portion of the clutch.

The casing 1 of the motor has a pistol-shaped handle 1a into which the cable 1b is led. The switch is marked 1c. A casing 2 which encloses the transmission gearing is screwed on the motor casing 1 by means of screws 3. On the front end of this casing 2 a tubular extension 4 is fitted, namely, by its being screwed on a bush 5 which, in turn, is inserted into the casing 2 and is held there by the pin 6.

A second bush 7 is revolubly mounted in the bush 5, and secured against axial displacement, on the one side, by the sprung ring 8 and on the other side by the ball thrust-bearing 9. The toothed wheel 10 of the gearing is fixed on the spindle 11. This spindle is revoluble and longitudinally displaceable in the bush 7. A bearing plate 12 is let into the recess 10a of the toothed wheel 10 and fastened by rivets 13. This plate has an inner and an outer collar-shaped flange 12a and 12b. Furthermore, three radial circular recesses are provided, which appear in the outer collar 12b as holes 12d, in the plate itself as grooves 12e of semicircular cross-section, and in the inner collar 12a as holes 12c. Rollers 14 are inserted in these recesses and secured against coming out radially by the sleeve 14a pushed over them. Lubricating grease enters through an axial bore 11b in the spindle 11, and is forced through the radial holes 11c proceeding from the axial bore 11b under the influence of the centrifugal force into lubricating grooves 11d running spirally on the periphery of the spindle. The front face of the bush 7 on the side towards the gearing has sector-shaped recesses 7a. The rollers 14 when in the clutched condition enter these recesses, and the collar 12b engages over the end of the bush 7. Inside the bush 7 two helical springs 15a and 15b are arranged, which bear at one end on the bottom of the bush 7 and on the other end against the ball-bearing 16 displaceable in the bush 7 and on the spindle 11. The ball-bearing is supported in its turn on a nut 20 through the intermediary of a bush 19. The bush 19 is axially displaceable on the spindle 11 and prevented from turning by a pin 17 inserted in longitudinal grooves 18 of the spindle 11 and the bush 19. The nut 20 is screwed on the threaded end 11a of the spindle 11.

The end face of the bush 7 facing the tool has claws 7b which engage in claws 21a in the front end of a bush 21 revolubly mounted in tubular part 4. A compression spring 22 is provided in the interior 21b of this bush 21 and presses a bolt 23 against the end 11a of the spindle 11. By this means, the claw clutch 7b, 21a is held out of engagement when the tool is not under load.

The front end of the bush 21 has a hexagonal opening 21c which serves for receiving the hexagonal insertion end of a screw-driver or the like. A ball 24 engages in this hexagonal opening 21c through a radial bore 21d in the bush 21 so as to engage in an annular groove in the inserted end of the screw-driver (not shown). The ball is held in the position shown by the inner flange 25A of a bush 25 placed round the front end of the bush 21. The bush 25 is longitudinally displaceable on the bush 21 against the pressure of a spring 26. To enable the screw-driver to be withdrawn from the insertion opening, the ball 24 must be given an opportunity of moving back in the opening 21d. This is effected by the bush 25 being displaced on the bush 21 against the pressure of the spring 26 in the direction of the drive.

The mode of working of the new clutch is as follows: When the tool is not under load, that is, when running free, the following parts revolve with the toothed wheel 10: spindle 11, plate 12, rollers 14, bush 7 with its recesses 7a, springs 15a, 15b, bearing 16, bush 19 and nut 20.

When to drive in a screw the screw-driver is applied to the head of the screw, the clutch 7b, 21a is engaged under the weight of the tool or the pressure exerted by the operator. The following parts also then share in the rotation, until the head of the screw is seated on the work: the bush 21 driven by the claws 7b and 21a, bush 25 with the holding members 24 and 26 associated with it, and finally the tool (not shown), namely the blade of the screw-driver.

When at the moment when the screw head becomes seated on the work, the resistance rises above the predetermined maximum amount, the new clutch 12, 14, 7a and 7 comes into operation. The rollers 14 emerge from the recesses 7a of the opposing clutch half, whilst overcoming the force of the springs 15a and 15b, by rolling over the flanks 7c of the recesses 7a. While rolling the rollers rotate in the recesses 12c, 12d, and 12e. To facilitate the rolling movement, the flanks 7c have the form shown enlarged in Fig. 8. It corresponds to a circluar arc of the roller radius R, which merges into a straight line that diverges from the vertical by a small angle $\alpha$. The transition from this straight line to the horizontal is broken by a small radius r. On emerging from the recesses 7a, the rollers 14 raise the toothed wheel 10, the spindle 11, nut 20, bush 19 and bearing 16 and compress the springs 15a and 15b.

During the now succeeding slip movements (the rollers enter the next recess 7a, come out of it, and enter the next recess and so on), the spindle 11 and the parts connected with it just specified perform a steady up and down movement—with the exception of the part of the bearing 16 bearing on the springs 15a and b—also a rotary movement. All the other parts above described as revoluble remain stationary during the slip movement until the tool is removed from the screw.

The nut 20 is provided with radial projections (not shown) which engage in corresponding recesses in the bush 19. This serves for securing the nut 20 against slackening. By tightening up the nut 20 the bush 19 can be displaced in an axial direction and thus the compression of the springs 15 altered. The magnitude of the torque that can be transmitted by the clutch 12, 14, 7a then depends on the adjustment of the compression.

The employment of cylindrical rollers described in the example of construction only permits the rollers to bear with their whole length on the flanks 7c of the recesses 7a during a single moment in the rolling movement, and for the following reasons:—If the upper edges of the bearing flanks 7c and the central axis of the rollers are both radially directed, a linear contact between roller and flank can take place only at the moment when the roller axis or the lowest peripheral line of the roller passing like the roller axis through the rocking centre coincides with the upper edge of the flank. This occurs only at the moment in which the roller in yielding has attained its highest point, that is, at the end of the yielding movement. If the roller is arranged radially and the flank 7c in such a way that the prolongation of its upper edge passes by the rocking centre at the distance of the roller radius, the roller only comes to bear at the beginning of the yielding movement with its full length, and, in consequence of the flank construction selected, with nearly a quarter of its peripheral surface, on this flank 7c. On the conclusion of the yielding movement this is no longer so, owing to the change of angle that has taken place between roller and flank. It has now been found that the moment most favourable for the impact action of the clutch for the bearing of the roller with its whole length on the flank 7c is the beginning of the yielding movement.

The special advantage of the arrangement of the bearing plate 12 in the side face of a gear wheel described in the example of construction lies in the fact that in this way not only is a separate clutch half saved, but also the clutch is easily reached by the lubricating grease, and thus the clutch can be attended to together with the gear.

As there are differences between the rolling speed at the inner and the outer ends of the radially arranged rollers 14, which increase considerably with rollers of greater length, according to a further feature of the invention, in cases where large bearing surfaces are necessary, i. e. with rollers of great length, a division of the roller into several separate rollers, rolling at different speeds and lying one behind the other in a radial direction, is provided for.

We declare that what we claim is:

1. In a device of the character described, a rotatable driving member, a driven member rotatable and slidable relative thereto and coaxial therewith, one of said members carrying a plate provided with radial semi-cylindrical grooves in the face thereof and annular collars provided with cylindrical openings in alinement and registering with said grooves, cylindrical clutch rollers rotatably mounted in said grooves and openings and bearing against the complementary surfaces of said grooves, the other member being provided with a plurality of recesses adapted to receive said rollers and thereby couple together said members, and resilient means urging said members together but permitting relative axial displacement thereof to disconnect said rollers from said recesses when the torque between said members exceeds a predetermined maximum.

2. In a device of the character described, a rotatable driving member, a driven member rotatable and slidable relative thereto and coaxial therewith, one of said members carrying a plate provided with semi-cylindrical bearing surfaces and annular concentric collars provided with alined openings, cylindrical clutch rollers rotatably mounted in said openings and imbeded in the complementary semi-cylindrical bearing surfaces, one opening at each end of each roller, the other member being provided with a plurality of recesses adapted to receive said rollers and thereby couple together said members, and resilient means urging said members together but permitting relative axial displacement thereof to disconnect said rollers from said recesses when the torque between said members exceeds a predetermined maximum.

3. In a device of the character described, a rotatable driving member, a driven member rotatable and slidable relative thereto and coaxial therewith, one of said members comprising a shaft and a plate secured thereto, said plate being provided with semi-cylindrical bearing grooves and annular concentric collars having alined openings, cylindrical clutch rollers rotatably mounted in said openings and embedded in the complementary semi-cylindrical bearing grooves, the openings in said inner collar being blocked at one end by said shaft, a sleeve mounted on said outer collar and blocking the openings therein at one end whereby said rollers are retained in said openings, the other member being provided with a plurality of recesses adapted to receive said rollers and thereby couple together said members, and resilient means urging said members together but permitting relative axial displacement thereof to disconnect said rollers from said recesses when the torque between said members exceeds a predetermined maximum.

4. In a tool of the character described, in combination, coaxial relatively slidable and rotatable driving and driven members, said members normally rotating as a unit but being adapted to rotate relatively to each other, a cylindrical clutch roller of substantially the same diameter throughout its length carried by and rotatable with one of said members and resiliently pressed into engagement with the other member to form a driving connection therewith, said cylindrical roller fitting for its entire length and approximately half its width in a complementary semi-cylindrical radial bearing surface provided in one of said members, and journal bearings carried by said member for holding said roller in contact with said semi-cylindrical surface, means on said other member providing alternate flat faces and flat-bottomed substantially sector-shaped recesses circumferentially elongated in the path of movement of said roller whereby the latter moves alternately out of a recess, along a flat face and into and through a recess when relative rotation of the members occurs, said recesses having end faces providing abutments against which the roller strikes and delivers a hammer blow at the termination of its passage through a recess, said abutments being shaped to move the roller out of the recesses after it has delivered such hammer blow.

5. In a tool of the character described, a casing, a driven member rotatably mounted therein, a driving member slidably and rotatably mounted on said driven member, said members normally rotating as a unit but being adapted to rotate relatively to each other, a cylindrical clutch roller carried by and rotatable with said driving member, said driving member being provided with a substantially semi-cylindrical radial groove receiving and providing a bearing surface for the entire length of the complementary cylindrical clutch roller, and journal bearings carried by said driving member for holding said roller within said groove, means on said driven member providing a plurality of substantially sector-shaped plane-bottom recesses adapted to receive said clutch roller and thereby couple together said members, and resilient means urging said members together but permitting relative axial displacement thereof to permit said roller to move out of said recesses when the torque between said members exceeds a predetermined maximum.

ERNST BAUMGRATZ.
FRANZ KRATZ.
HERMANN STEINHART.